United States Patent Office 2,852,552
Patented Sept. 16, 1958

2,852,552

1-AMINO-1-HYDROXY-2,2-DICYANOETHYLENE AND ITS SALTS

Ernest Lewis Little, Jr., and Howard Frederick Mower, Wilmington, Del., assignors to E. I. du Pont de Nemours and Company, Wilmington, Del., a corporation of Delaware No Drawing. Application April 8, 1957
Serial No. 651,189

6 Claims. (Cl. 260—465.5)

This invention relates to new polyfunctional compounds and to a process for their preparation. More particularly it relates to new tetrasubstituted ethylenes.

Certain cyano-substituted ethylenes, particularly acrylonitrile, maleonitrile and vinylidene cyanide, have achieved importance as chemical intermediates or polymerizable monomers. More recently, tetracyanoethylene has been prepared and found to be useful in the preparation of a wide variety of compounds, including dyes (U. S. 2,762,810; 2,762,832–3; Brit. 757,773).

It is an object of this invention to prepare a new and relatively simple class of tetra-substituted cyanoethylenes from malononitrile. More specifically, it is an object of the present invention to obtain 1-amino-1-hydroxy-2,2-dicyanoethylene and its salts having herbicidal properties. These and other objects will become apparent from the following disclosure.

Alkali metal salts of the invention are prepared by the reaction of an alkali metal cyanate with malononitrile. The salt thus formed can be converted to the free acid by reaction with a cation exchange resin. These reactions are illustrated by the following equations in which M represents an alkali metal:

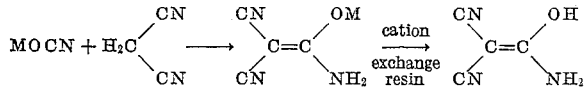

The salt is conveniently prepared by heating together an alkali metal cyanate and malononitrile. The proportions of the reactants used are not critical, satisfactory results being obtained with molar ratios of cyanate to malononitrile varying from 2:1 to 1:2. Essentially equimolar proportions are however preferred from the standpoint of economy. The salt can also be prepared by refluxing the alkali metal cyanate and malononitrile in a suitable solvent, e. g., dimethylformamide. The free acid is obtained by passing the salt through a cation exchange column.

The reaction temperature for the preparation of the salt should be from about 130–170° C. for direct reaction between the ingredients, with 150° C. being the preferred operating temperature. In cases where the reaction proceeds in a solvent at reflux, it is preferred that the temperature should not exceed 150° C. The pressure used is not a significant factor.

Both the acid and the potassium salt of this invention are stable, white crystalline solids. The acid decomposes at temperatures above 300° C. while the potassium salt melts with decomposition at 277° C. The acid is soluble in acetonitrile, water, ethanol, dimethylformamide, and aqueous organic solvents, such as acetone-water mixtures, while the alkali metal salts are soluble in water. dimethylformamide, and aqueous ethanol.

Aqueous solutions of the free acid react readily with bases and with a variety of heavy metal salts to form the corresponding salts of the acid. Thus reaction of 25% solutions of 1-amino-1-hydroxy-2,2-dicyanoethylene with solutions of silver nitrate and with mercurous acetate give white precipitates of the corresponding metal salts.

Examples 1 and 2 below describe the preparation of the potassium salt of 1-amino-1-hydroxy-2,2-dicyanoethylene, while Example 3 shows the conversion of the salt to the acid.

Example 1

Eighty-one parts of potassium cyanate and 66 parts of malononitrile were mixed together in an open beaker. Heat was applied slowly and the melt vigorously stirred. The reaction mixture gradually thickened until, at a temperature of about 130–150° C. a doughy solid was obtained. This material was cooled and recrystallized from aqueous ethanol. The product—the potassium salt of 1-amino-1-hydroxy-2,2-dicyanoethylene—was obtained in 78% yield. This salt melted at 277° C. with decomposition.

Analysis.—Calcd. for $C_4H_2N_3OK$: C, 32.70; H, 1.46; N, 28.59. Found: C, 32.98; H, 1.70; N, 28.72.

The infrared spectrum of this substance is consistent with the above structure showing absorptions in the regions of $NH_2$, conjugated nitrile and conjugated ethylenic groups.

The presence of an amino group was further indicated by the fact that nitrogen was liberated when the compound was reacted with nitrous acid.

In carrying out the reaction of potassium cyanate and malononitrile it is necessary to avoid heating above the prescribed temperature, otherwise a vigorous exothermic reaction takes place leading to the complete charring of the reactants.

Example 2

Sixty-six parts of malononitrile was dissolved in 400 parts of dimethylformamide. Eighty-one parts of finely ground potassium cyanate was added slowly with vigorous stirring. The reaction mixture was heated with continued stirring, under refluxing conditions for ¾ hr. and then, while still hot, filtered. The filtrate was cooled to 0° C., and upon standing at this temperature, 106 parts (71% yield) of the potassium salt of 1-amino-1-hydroxy-2,2-dicyanoethylene was obtained in white crystals.

Although potassium cyanate has been used in the examples other alkali metal cyanates are likewise operable.

Example 3

A solution of 15 g. of the potassium salt of 1-amino-1-hydroxy-2,2-dicyanoethylene in 100 ml. of water was passed slowly through a sulfonated cation exchange [Amberlite IR 120(H) marketed by Rohm & Haas] column (8½″ long). The column was washed with about 700 ml. of water until the eluate was no longer acidic to litmus. The solution was then evaporated to dryness under reduced pressure. The solid residue was recrystallized from acetonitrile to give a white crystalline 1-amino-1-hydroxy-2,2-dicyanoethylene in 85% yield. This acid decomposes above 300° C.

Analysis.—Calcd. for $C_4H_3N_3O$: C, 44.0; H, 2.75; N, 38.50; M. W. 100. Found: C, 44.19; H, 2.85; N, 38.66; M. W. 96.88.

In addition to the salts mentioned above, ammonium salts, group I and II metal salts such as sodium, lithium, barium, calcium, and similar basic salts can be obtained by reaction of the acid with the corresponding bases.

The 1-amino-1-hydroxy-2,2-dicyanoethylene of this invention is useful as a herbicide for broad-leaved plants, approximately 1% solutions of the acid killing the plants used in standard tests. This acid is also useful as a cotton defoliant. For example, when the leaves of cotton plants are sprayed with a 1% solution of the acid, the leaves fall off within 14 days. 1-amino-1-hydroxy-2,2-dicyanoethylene and its potassium salt are also useful as agricultural fungicides. Both have protective action against early blight of tomato and against apple scab.

Thus following treatment of tomato plants with a 0.2% solution of the acid only 10% tomato blight appeared, while only 14% apple scab appeared after treatment of the trees with a 0.008% solution of the acid. With the potassium salt, only 26% tomato blight appeared after treatment with a 0.2% solution, while 38% apple scab appeared after treatment with a 0.008% concentrated solution.

The compounds of the invention may exist in tautomeric forms such as

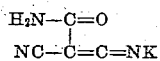

It is intended that the claims cover the compounds specifically named and their tautomers.

We claim:
1. 1-amino-1-hydroxy-2,2-dicyanoethylene.
2. A compound of the group consisting of 1-amino-1-hydroxy-2,2-dicyanoethylene and the ammonium, group I and group II metal salts thereof.
3. The potassium salt of 1-amino-1-hydroxy-2,2-dicyanoethylene.
4. The process comprising reacting an alkali metal cyanate with malononitrile at a temperature within the range of about 130°–170° C.
5. The process of claim 4 wherein the cyanate is potassium cyanate.
6. The process of preparing 1-amino-1-hydroxy-2,2-dicyanoethylene which comprises reacting an alkali metal cyanate with malononitrile at a temperature within the range of about 130°–170° C. and passing a solution of the salt thus obtained through a cation exchange resin to free the acid.

References Cited in the file of this patent

UNITED STATES PATENTS

| | | |
|---|---|---|
| 2,375,185 | Bergel et al. | May 8, 1945 |
| 2,773,892 | Little, Jr. | Dec. 11, 1956 |